Nov. 10, 1925.
J. Y. FOLEY
1,560,683
INSECT SHIELD FOR ANIMALS
Filed May 15, 1924
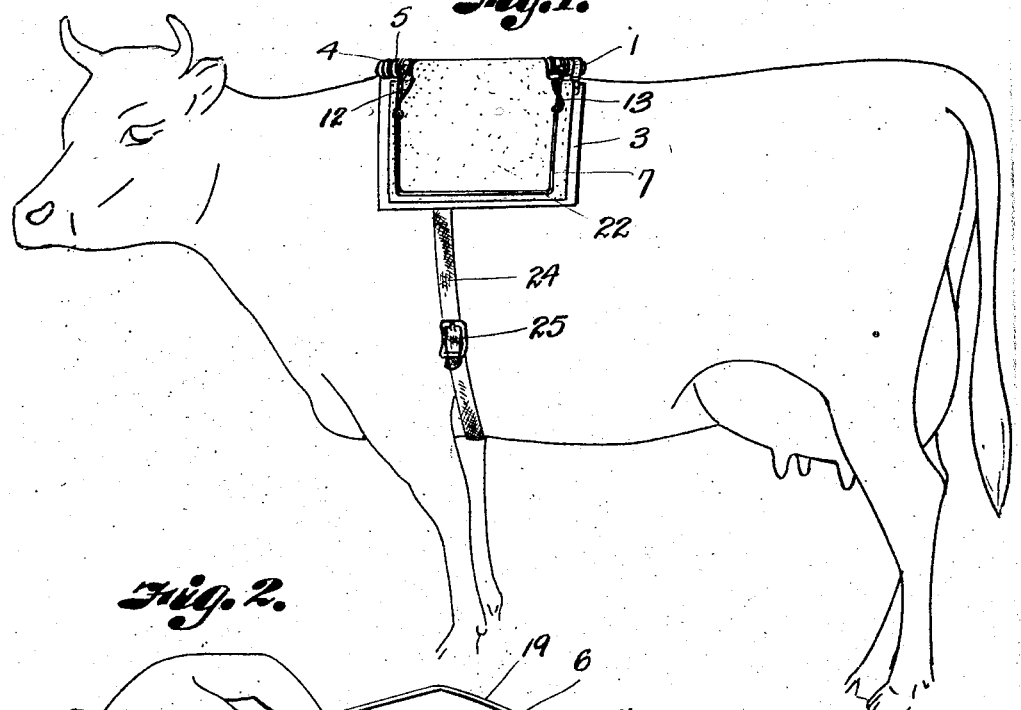
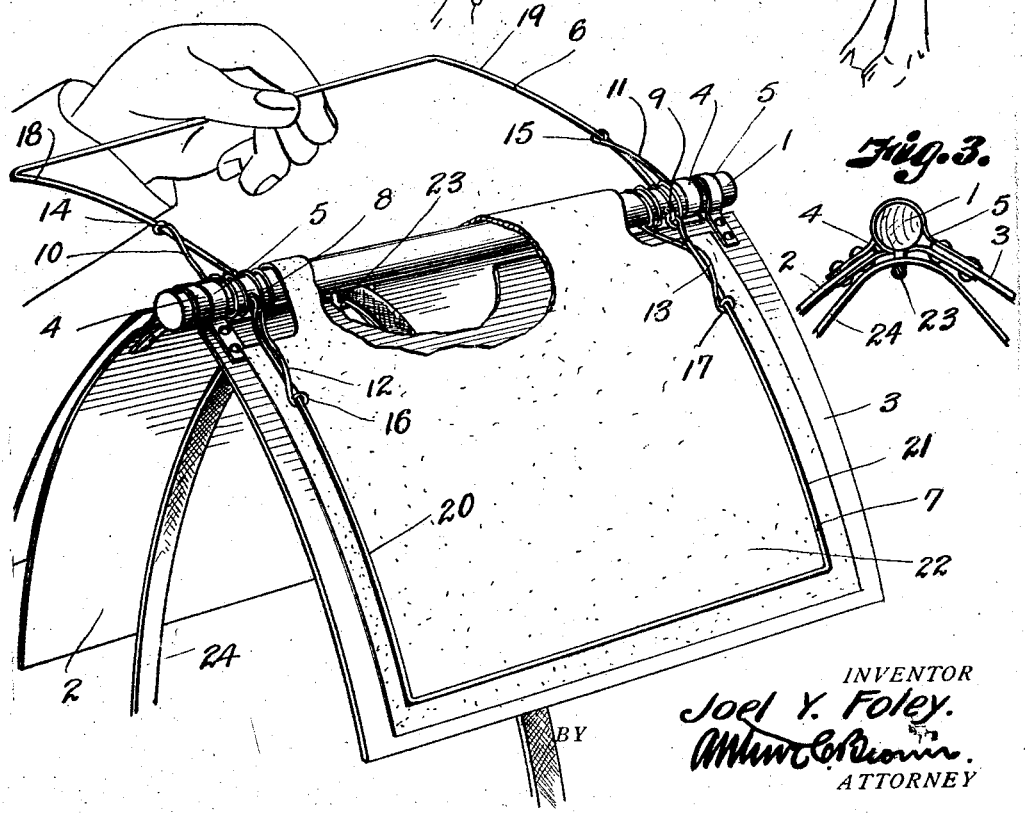
INVENTOR
Joel Y. Foley.
ATTORNEY Patented Nov. 10, 1925.

1,560,683

UNITED STATES PATENT OFFICE.

JOEL Y. FOLEY, OF LINDEN, MISSOURI.

INSECT SHIELD FOR ANIMALS.

Application filed May 15, 1924. Serial No. 713,448.

*To all whom it may concern:*

Be it known that I, JOEL Y. FOLEY, a citizen of the United States, residing at Linden, in the county of Clay and State of Missouri, have invented certain new and useful Improvements in Insect Shields for Animals; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to an insect shield for animals and particularly to a shield for cattle. In the summer time, cattle, particularly cows are worried to a considerable extent by flies. The flies usually light on the withers of the cow and due to the incessant worry, the milk production is materially reduced, so I have provided means for protecting the withers of the cow and in one aspect of my invention, I contemplate the use of fly paper to catch the flies.

The invention is illustrated in the form of a saddle fastened to the animal by a surcingle, so it will be held over the withers of the animal. In all cases the fly paper may need not be employed, but where it is, it will attract the flies in the usual manner and thereby prevent them from worrying the animal, allowing the animal to properly feed and thereby enable it to produce the normal supply of milk.

The preferred construction of the invention will be specifically described hereinafter, reference being had to the accompanying drawings, in which Fig. 1 is a side view of a cow to which my invention is applied.

Fig. 2 is a perspective view of the shield or protector, parts being broken away to better illustrate other parts, and Fig. 3 is a sectional view through the middle portion of the protector.

The invention consists of a centrally located rod or bar 1 on which are hinged two side members 2 and 3, each movable independently of the other and fastened to the bar or rod 1 by strap hinges 4 and 5 respectively, there being hinges 4 and 5 at each end of the rod.

The shields consist of suitable sheets of appropriate material and fastened to the bar 4 are fly paper holding loops 6 and 7. The loops consists of rectangular frames connected to the ends of the bar as at 8 and 9. Coil springs are provided on the ends of the bar, the ends of which terminate in spring arms 10, 11, 12 and 13, with hooked ends 14, 15, 16 and 17 overlying the wire side bars 18, 19, 20 and 21 to force the loops 6 and 7 toward the shields 2 and 3 and thereby clamp the fly paper 22 on the shields.

In order to apply the fly paper, it will be necessary only to lift one of the loops, for example 6, insert the fly paper under it, lift the other loop and pass the edge of the fly paper under it, or lift both loops at the same time, place the fly paper upon the two shields 2 and 3 and then allow the loops to rest upon the fly paper.

The bar or rod 1 has a loop 23 beneath it through which the girth or surcingle 24 passes, the girth or surcingle being long enough to pass around the animal and be fastened by the buckle 25 in any well known way. The surcingle or girth will securely hold the shield upon the animal so that it will not become dislodged and since a fly usually attacks an animal on or about the withers, it will be apparent that the animal will be relieved of the annoyance of the flies in a convenient manner.

I designate the structure including the shields and means for fastening them together as a saddle because the device fits on the animal as a saddle and is held by a girth in substantially the same manner as a saddle is held in place.

What I claim and desire to secure by Letters-Patent is:

1. A device of the class described comprising a center bar, shields pivoted to the center bar, means for securing fly paper to the shields, and means for securing the center bar to the back of the animal.

2. A device of the class described comprising a center bar, shields on opposite sides of the center bar, a girth for securing the center bar to an animal and spring frames carried by the center bar normally urged toward the shields to hold fly paper between them and the shields.

3. A device of the class described, comprising a center bar, two independently movable shields hinged to the center bar and located on opposite sides thereof, spring loops on opposite sides of the center bar for holding fly paper upon the shields and a girth for securing the center bar to the animal.

In testimony whereof I affix my signature.

JOEL Y. FOLEY.